June 19, 1934.  L. T. TROLAND  1,963,510
FILM MARKING
Filed Oct. 31, 1932  3 Sheets-Sheet 1
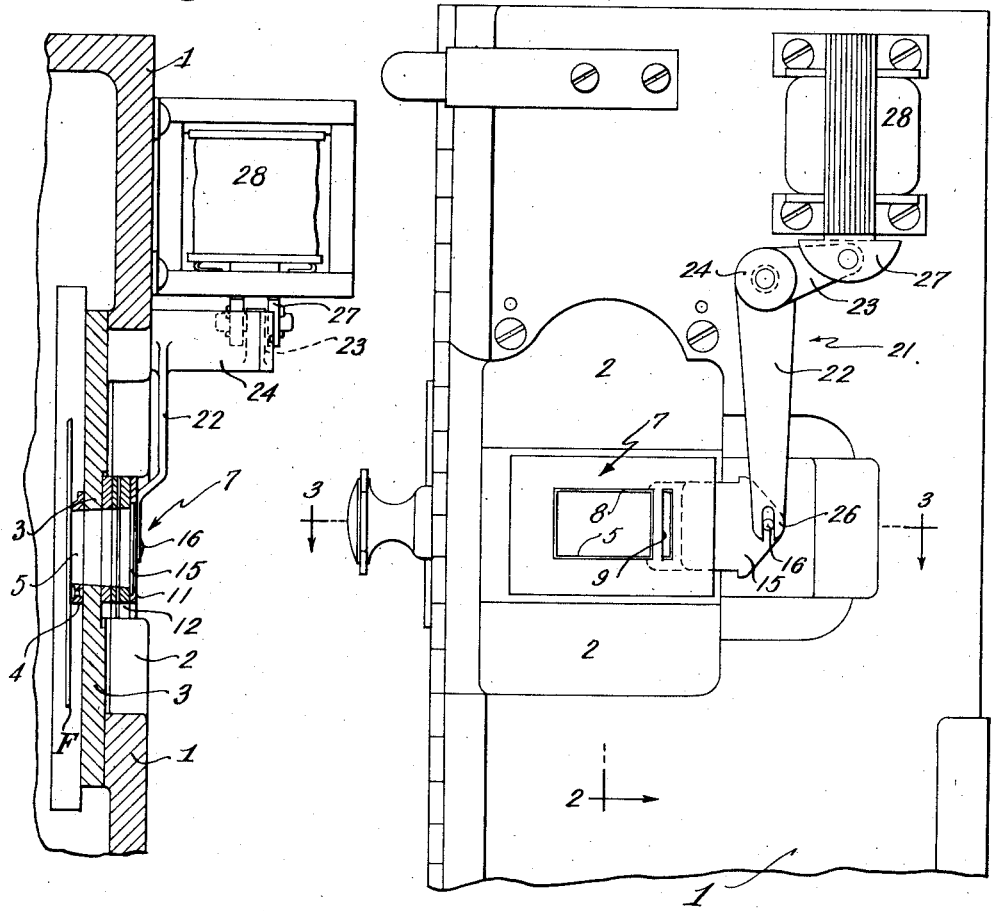
Inventor
Leonard T. Troland, dec'd
by Cambridge Trust Company, Executor
by Roberts, Cushman & Woodbury
Att'ys.

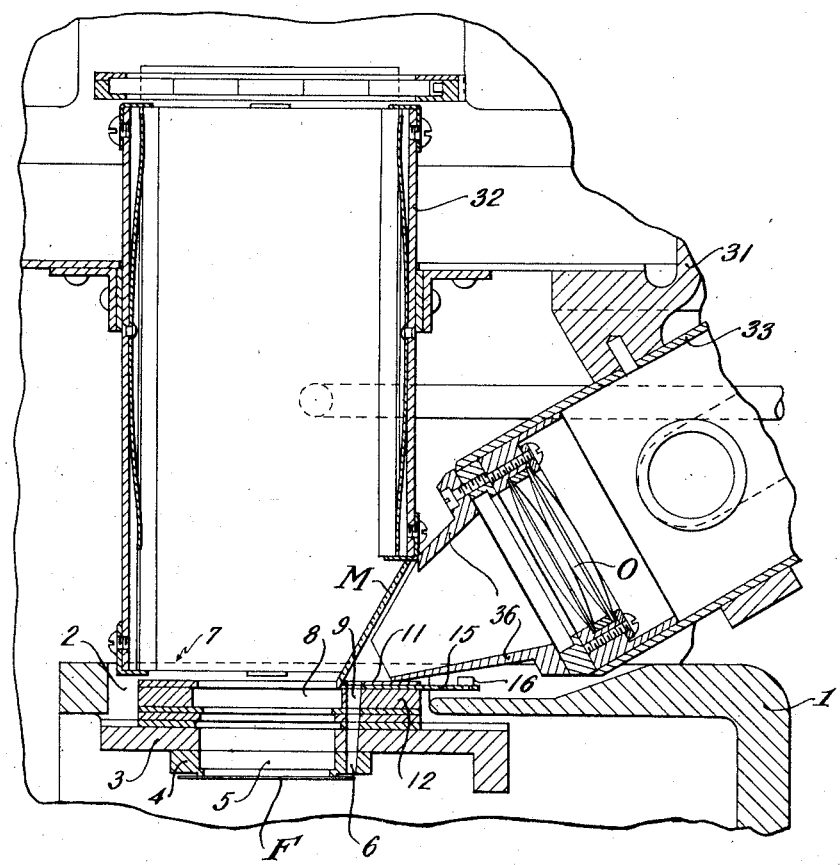

Patented June 19, 1934

1,963,510

UNITED STATES PATENT OFFICE 1,963,510

FILM MARKING

Leonard T. Troland, deceased, late of Cambridge, Mass., by Cambridge Trust Company, executor, Cambridge, Mass., assignor to Technicolor Motion Picture Corporation, Hollywood, Calif., a corporation of Maine Application October 31, 1932, Serial No. 640,511

7 Claims. (Cl. 88—24)

The present invention relates to providing cinematographic films with marginal numbers or other identification marks. It is comparatively easy to copy marginal numbers from a negative film to a positive film while printing the pictures in a contact printer, where the emulsions are in close contact, so that the marks can be printed practically independent of the picture records of the film. However, if the film is to be reproduced with a projection printer, certain difficulties arise, one of which is due to the fact that it is very difficult to use two different optical systems, each arranged in the conventional manner, for printing the pictures and the marks, whereas it is on the other hand desirable to expose the marks with a light intensity independent of that with which the pictures are printed, the latter intensity being in many cases regulated by changing the aperture area of the optical system. It is, therefore, the main object of the present invention to provide an arrangement for recording film marks in a projection printer together with the film pictures, but independently thereof, as far as the manner of exposure is concerned.

In another aspect, the invention provides an arrangement for conveniently and efficiently arranging in a projection printer an independent light source for recording film marks through the optical system which is used for projecting the film pictures, and in still another aspect, it provides automatic means for selecting certain marks to be printed.

Other objects and advantages will be apparent from the following description of an embodiment of the invention by way of example, referring to drawings, in which:

Fig. 1 is an elevation of part of a negative head of a projection printer;

Fig. 2 is a vertical section on lines 2—2 of Fig. 1;

Fig. 3 is a cross-section on lines 3—3 of Fig. 1, combined with a section on the same plane of part of the lamp housing associated with the negative head.

Figure 4:
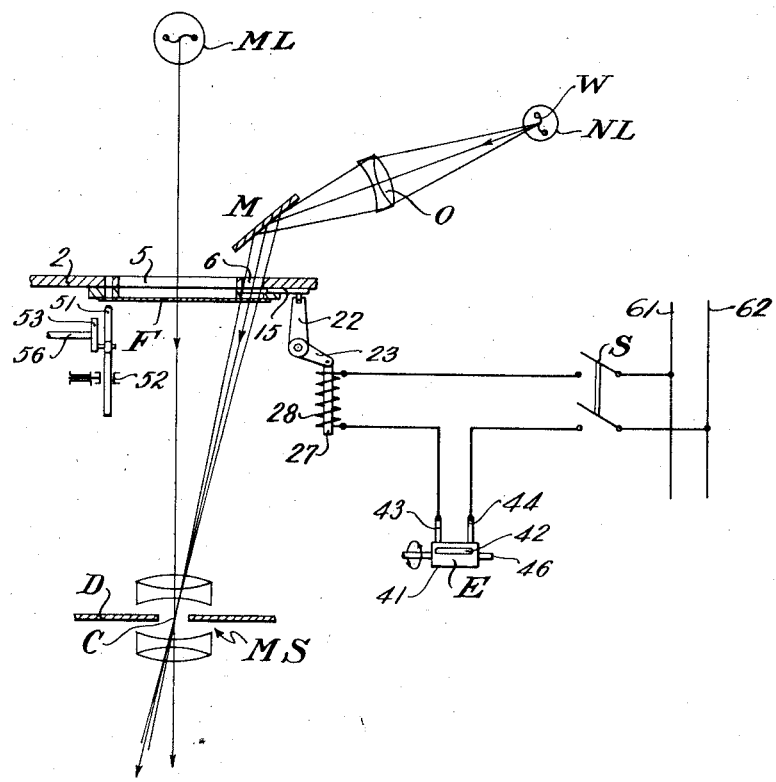
Fig. 4 is a diagrammatic representation of the optical system and the electric control arrangement according to the invention.

In Figs. 1, 2, and 3, 1 is a portion of the housing of the negative film movement of a projection printer. The aperture window 2 of the housing wall is closed by aperture plate 3 forming part of a conventional film movement shown schematically in Fig. 4 as comprising a transport pin 51 periodically engaging film perforation 50, sliding in a pivoted sleeve 52 and actuated by eccentric 53 fixed to shaft 56. An aperture frame 4 having an aperture 5 for the film picture (Fig. 3), and a smaller aperture 6 covering the area occupied by marginal marks of the film F to be printed, is secured to one side of the aperture plate. The other side of the aperture plate has attached thereto a shutter support 7 with windows 8 and 9 corresponding to the apertures 5 and 6. Between cover plate 11 and guide plate 12 (Figs. 2 and 3) slides a shutter 15 having a pin 16 at the side protruding from the shutter support. A bell crank 21 with two arms 22 and 23 is fulcrumed on the housing at 24. The end of arm 22 has the shape of a fork 26 engaging pin 16 of the shutter plate. The other arm 23 of the bell crank is joined to the armature 27 of a solenoid 28 fastened to housing 1. As will now be apparent, a slight motion of the armature 27, upon being attracted by the magnet, causes the bell crank to turn and to move the shutter slide 15 outwardly, opening the margin aperture 9.

Fig. 3 shows part of the lamp housing of the projection printer, 31 being a casting which supports aperture tubes 32 and 33 of the main printing lamp and the edge mark printing lamp respectively, the lamps themselves and the larger part of their housings not being shown in Fig. 3. Tube 33 ends in a lens system O with a mirror support 36, the latter having suitably attached thereto a mirror M. The mirror and the mirror support form an aperture which extends somewhat into the window 2 of the film movement housing 1, and contacts with marginal aperture 9, the mirror separating at the same time the two windows 8 and 9. It will be understood that the lamp housing is independent of the film movement housing and that, if desired, it can be mounted on a mechanism permitting it to be swung away from, and again brought into contact with, the film movement aperture.

Referring to Fig. 4, the optical arrangement of the edge mark printer will now be explained. The main printing lamp ML illuminates the film picture recorded on film F, and framed in aperture 5, with diffused light, which is then projected by main optical system MS towards the emulsion upon which original film F is to be copied. The edge printer lamp NL is arranged at the side of the main printing lamp, so as not to obstruct the space for the usually rather voluminous housing of the main lamp, and the collimated light coming from NL through O is reflected into the margin aperture 6 by reflector M. This lens system O is so designed and so placed with respect to the lamp NL, the reflector M, and the optical system MS, that the image of the filament W of NL is focused in C, the center of the aperture of diaphragm D, or the optical center of system MS. Hence, the bundle of light rays for printing the marginal marks passes through the center of MS, and the intensity of the light coming from NL is never obstructed or substantially diminished if the opening of diaphragm D of MS is decreased in order to regulate the intensity of the light for printing the film pictures.

The solenoid 28 is connected to terminals 61 and 62 supplied from a suitable source of electric current, through main switch S, and in series to a control switch E, referred herein as edge printer switch. This switch is preferably actuated in synchronism with the film drive and may comprise a disk 41 of insulating material, with a metallic segment 42 imbedded therein and cooperating with two slide contacts 43 and 44, the disk rotating with a shaft 46 which is part of the driving mechanism of the printer and geared to shaft 56 of the film movement, as for example described in detail in the copending application for Cinematographic printer of Leonard T. Troland and Malcolm H. Ames, Serial No. 640,510, of even date. The shaft 43 may make one revolution for several advancing steps of the film movement for film F, and energizes the magnet 28 once for each revolution, when segment 42 bridges contacts 43 and 44. Upon 28 being energized, shutter 15 is moved outwardly by armature 27 and bell crank 21, uncovering aperture 9, so that an edge number can be printed, whereupon 28 is deenergized so that shutter 15 again closes aperture 9. By properly adjusting switch E and its drive from the printer, it is possible to copy a mark with each negative picture, or the marks of certain pictures separated by any desirable number of intermediate pictures, as for example each sixteenth edge number. It is also apparent that a plurality of edge printers can be energized from one or several edge printer switches associated with the driving gear of the printer, that the exposure of the edge marks is quite independent of the diaphragm opening of the main lens MS, and that the arrangement permits the use of edge number printing lamps separate from the main lamp and conveniently arranged without in any way interfering with the printing of the film pictures. It will also be apparent that the arrangement can be varied in different respects without deviating from its underlying principle, for example by using a prism instead of a mirror M, by employing different means for actuating the margin shutter from the printer drive, or by using film mark negatives other than integral with the picture negative.

It should be understood that the present disclosure is for the purpose of illustration only and that this invention includes all modifications and equivalents which fall within the scope of the appended claims.

What is claimed is:

1. Projection apparatus comprising means for confining a transparency intermediate an optical system and a source of diffused light for projecting said transparency through said optical system, an auxiliary lamp, and a lens intermediate said transparency and said auxiliary lamp for projecting said transparency with collimated light, said lens focusing said collimated light in the approximate optical center of said optical system, whereby said collimated light is not affected by the aperture of said optical system.

2. Cinematographic apparatus comprising a film picture aperture, an optical system, a source of light for diffused illumination of a film picture in said picture aperture for projection through said optical system, an auxiliary aperture for the film margin, an auxiliary light source, and a lens system intermediate said auxiliary source and said auxiliary aperture for focusing said lamp through said auxiliary aperture in the approximate optical center of said optical system.

3. A cinematographic projection printer comprising a film movement, a film picture aperture associated with said movement intermediate a light source and an optical system, an auxiliary aperture for the film margin, means synchronized with said movement for periodically opening and closing said auxiliary aperture, an auxiliary light source, and means for focusing said auxiliary source through said auxiliary aperture in the approximate optical center of said system.

4. A cinematographic projection printer comprising a film movement, a film picture aperture associated with said movement, a main printing light illuminating said aperture, an optical system for projecting a film in said picture aperture, a film margin aperture, means for opening and closing said margin aperture, an auxiliary light and a lens for projecting the film margin through said optical system, and means associated with said movement for periodically actuating said opening and closing means.

5. Cinematographic apparatus comprising a main aperture for the pictures of a film, an auxiliary aperture framing marginal film marks, an optical system, a light source illuminating the film picture for projection by means of said system, an auxiliary lamp removed from the light path of said light source, a lens intermediate said lamp and said auxiliary aperture, and light deviating means intermediate said lens and said auxiliary aperture, said lens and said deviating means focusing said lamp in the approximate center of said system through said auxiliary aperture.

6. A cinematographic projection printer comprising a film movement, a main aperture, an auxiliary aperture, an optical projection system, a main lamp and an auxiliary lamp associated with said aperture, respectively, means for focusing light from said auxiliary lamp through said auxiliary aperture in the approximate optical center of said projection system, a shutter normally obstructing said auxiliary aperture, electric means for moving said shutter, and a switch associated with said movement for energizing said electric means, whereby said auxiliary aperture is periodically opened and closed in synchronism with the film advanced by said movement.

7. Projection apparatus comprising means for confining two transparent areas, means including a light source for illuminating said areas, an optical system including a diaphragm for projecting one of said areas under control of said diaphragm, and means for focusing said source through the second area approximately in the aperture of said diaphragm, said optical system projecting an image of said second area regardless of the opening of said diaphragm.

CAMBRIDGE TRUST COMPANY,
*Executor of the Last Will and Testament of Leonard T. Troland, Deceased,*
By A. M. WHEELER,
*Its Assistant Secretary.*